(12) United States Patent
Hammi

(10) Patent No.: US 6,761,360 B2
(45) Date of Patent: Jul. 13, 2004

(54) INTERFERENCE-FIT RETAINER GASKET

(75) Inventor: Ray J. Hammi, El Cajon, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 16 days.

(21) Appl. No.: 09/814,905

(22) Filed: Mar. 22, 2001

(65) Prior Publication Data

US 2002/0135137 A1 Sep. 26, 2002

Related U.S. Application Data

(60) Provisional application No. 60/216,851, filed on Jul. 7, 2000.

(51) Int. Cl.[7] .................................................. F16J 15/02
(52) U.S. Cl. ........................ 277/630; 277/637; 277/641; 277/644; 277/649; 220/806
(58) Field of Search .................................. 277/630, 637, 277/640–2, 644, 648, 61 L, 626, 594, 596, 598, 649; 220/327, 806, 803, 804

(56) References Cited

U.S. PATENT DOCUMENTS

| 218,894 | A | * | 8/1879 | Morrison et al. ............ 277/641 |
|---|---|---|---|---|
| 1,988,044 | A | * | 1/1935 | Moran ..................... 220/592.04 |
| 2,182,246 | A | * | 12/1939 | Boyer et al. ................. 277/329 |
| 2,263,653 | A | * | 11/1941 | Smith et al. .............. 122/448.1 |
| 2,517,012 | A | | 8/1950 | Miller |
| 3,088,627 | A | * | 5/1963 | Saunders .................... 220/377 |
| 3,215,442 | A | | 11/1965 | Papenguth |
| 3,259,404 | A | | 7/1966 | Papenguth |
| 3,334,774 | A | * | 8/1967 | Poltorak ..................... 220/378 |
| 3,554,567 | A | * | 1/1971 | Carroll et al. .............. 277/641 |
| 3,578,346 | A | | 5/1971 | Jelinek |
| 3,635,480 | A | | 1/1972 | Bain et al. |
| 3,720,420 | A | * | 3/1973 | Jelinek et al. .............. 277/611 |
| 3,746,348 | A | | 7/1973 | Stone |
| 3,863,421 | A | | 2/1975 | Busch et al. |
| 4,026,564 | A | | 5/1977 | Metcalfe |
| 4,219,816 | A | | 8/1980 | Schenkel et al. |
| 4,324,517 | A | | 4/1982 | Dey |
| 4,530,443 | A | | 7/1985 | Gorges |
| 4,575,105 | A | | 3/1986 | le Pierres |
| 4,579,248 | A | | 4/1986 | Gorges |
| 4,597,583 | A | * | 7/1986 | Inciong et al. .............. 277/591 |
| 4,776,483 | A | | 10/1988 | Carrey |
| 4,854,476 | A | * | 8/1989 | Serio, Jr. ................... 220/4.01 |
| 4,867,461 | A | * | 9/1989 | Shimmell .................... 277/593 |
| 4,934,715 | A | * | 6/1990 | Johnson ...................... 220/378 |
| 5,011,162 | A | | 4/1991 | Helinek |
| 5,149,109 | A | | 9/1992 | Jelinek et al. |
| 5,183,267 | A | | 2/1993 | Ackerman et al. |
| 5,213,286 | A | | 5/1993 | Elliott et al. |
| 5,492,343 | A | | 2/1996 | Smith et al. |
| 5,525,226 | A | * | 6/1996 | Brown et al. ............... 210/443 |
| 6,105,973 | A | * | 8/2000 | Butler et al. ................ 277/638 |
| 6,257,592 | B1 | * | 7/2001 | Hashizawa et al. ........ 277/596 |

* cited by examiner

Primary Examiner—Alison K. Pickard
(74) Attorney, Agent, or Firm—John A. Molnar, Jr.

(57) ABSTRACT

A gasket for interposition between a first and an opposing second interface surface of a sealing assembly. The gasket includes a generally planar retainer and a generally annular elastomeric member supported on the retainer. The retainer has an inner and an outer perimeter which together define an closed geometric shape which is registrable about a periphery of one of the first and second surfaces of the sealing assembly. The elastomeric member has a sealing portion, and a concentric retaining portion which is generally-upstanding relative to the retaining portion. The sealing portion is configured to be compressible axially intermediate the first and second interface surfaces for effecting one or more fluid-tight seals therebetween. The elastomeric member, in turn, has oppositely disposed first and second axial surfaces. One of the first and second axial surfaces defines a margin of the retaining portion sized to interferingly engage the periphery when the gasket is mounted coaxially thereto. Such interfering engagement of the retaining portion and the periphery is effective to retain the gasket about the periphery.

27 Claims, 8 Drawing Sheets

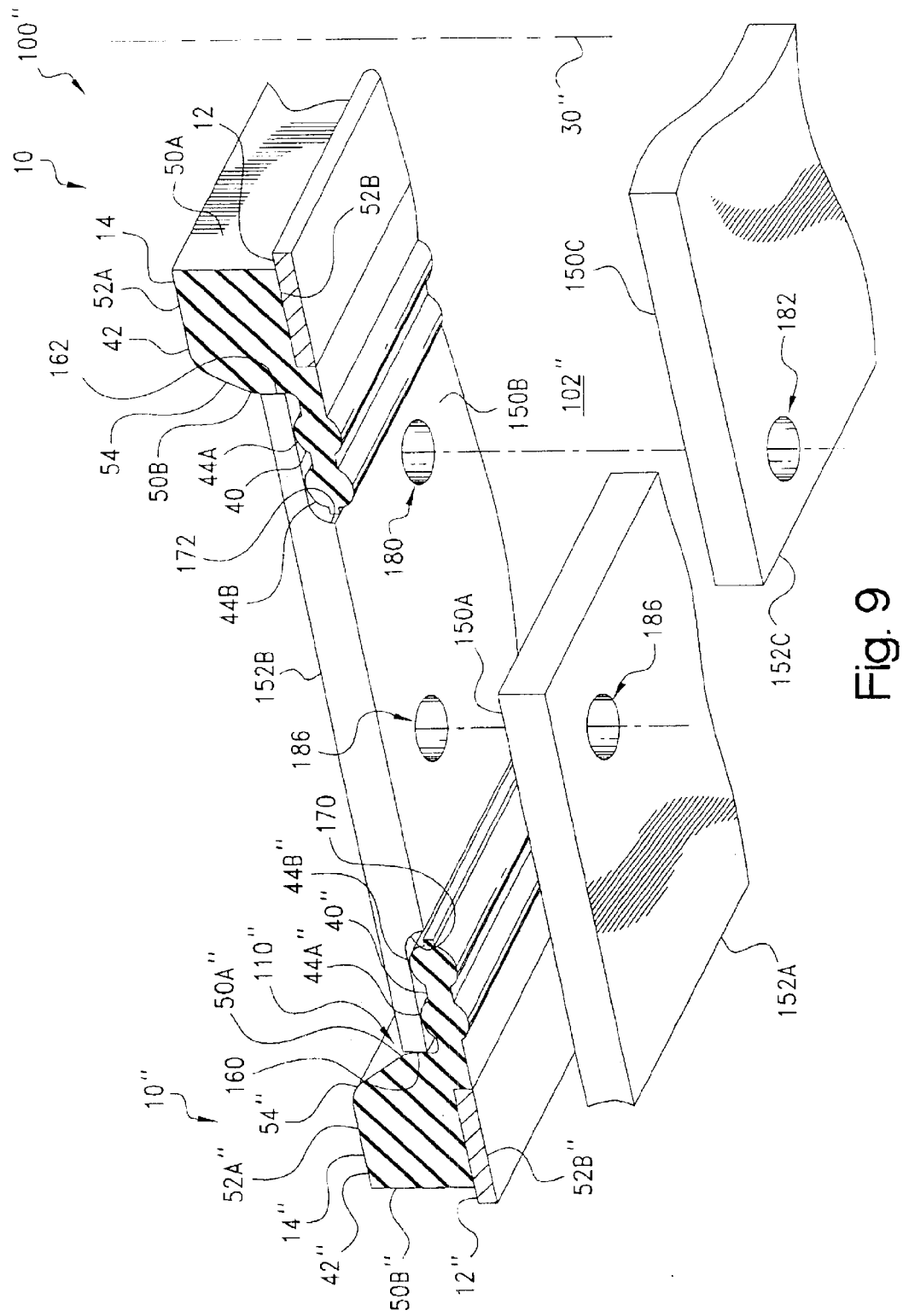

INTERFERENCE-FIT RETAINER GASKET

CROSS-REFERENCE TO RELATED CASES

The present application claims priority to U.S. Provisional Application Ser. No. 60/216,851; filed Jul. 7, 2000.

BACKGROUND OF THE INVENTION

The present invention relates broadly to a sealing construction for providing a fluid seal intermediate a pair of opposed, mating parts or structures, and more particularly to an interference-fitting retainer gasket construction adapted to provide a fluid seal between such mating structures as aircraft wings and fuel access panels wherein the access panel is mounted to the underside of the wing skin.

Gaskets of the type herein involved are employed in a variety of sealing applications, such as in commercial, industrial, or military equipment, vehicles, or aircraft for compression between the opposing or faying surfaces of a pair of mating parts or structures to provide a fluid-tight interface sealing thereof. In basic construction, such gaskets are typically are formed of a relatively compressible, annular seal member having a central aperture configured for registration with the corresponding margins of the surfaces.

The seal member typically is supported by an annular metal or plastic retainer. In such an arrangement, the retainer is stamped or molded to conform to the surface geometry of the mating structures, with the seal member being molded-in-place in a groove formed into one or both sides of the retainer, or about the inner and/or outer periphery of the retainer to form an integral gasket structure. Representative retainer-supported gaskets are shown, for example, in U.S. Pat. Nos. 3,195,906; 3,215,442; 3,259,404; 3,578,346; 3,635,480; 3,720,420; 3,746,348; and 4,026,565, and are marketed commercially by the O-Seal Division of Parker-Hannifin Corporation, San Diego, Calif., under the tradename "Integral Seals."

In service, the gasket is clamped between the mating surfaces to effect the compression and deformation of the seal member and to develop a fluid-tight interface with each of those surfaces. Most often, the compressive force is provided using a circumferentially spaced-apart arrangement of bolts or other fastening members, each of which is received through an indexed pair of bores formed within the surfaces. Depending upon the geometry of the gasket, the fastening members also may be indexed through corresponding apertures formed within the seal or retainer member of the gasket.

Particularly for applications which require the positioning of the gasket between the underside of a structure, such as and aircraft wing, and a mating structure, such as a fuel access door, it sometimes is problematic for the installer to maintain a proper alignment of the parts. Heretofore, this problem has been addressed either by using epoxy or other formed-in-place gaskets or caulks, or with various clip or plastic snap arrangements to secure the gasket in place during mounting. As to these formed-in-place gaskets or caulks, their application requires considerable training and skill, and often is an involved processes requiring several hours for completion. Alternatively, the clips and snaps employed are sometimes difficult to install and/or to remove.

In view of the foregoing, it is apparent that improvements in the construction of retainer gaskets for aerospace and other applications would be well-received by industry. A preferred gasket construction would be economical to manufacture, but also would exhibit reliable sealing performance. Such a gasket additionally would facilitate installations, such as in the underside of aircraft wings, requiring that the gasket be mounted in an orientation which complicates the alignment of the mating parts.

BROAD STATEMENT OF THE INVENTION

The present invention is directed to a retainer gasket construction particularly adapted for providing a fluid-tight seal about a periphery intermediate an opposing pair of interface surfaces such as may be found between an aircraft wing and a mating fuel access door assembly. The gasket is of a closed geometric shape and includes a generally planar, preferably metal, retainer and an elastomeric member which is supported on the retainer. The elastomeric member is molded or otherwise formed as having a generally-annular sealing element which may be configured as one or more seal beads, and a retaining element which is generally upstanding relative to the sealing element as extending axially out of the plane thereof. The retaining element may be molded integrally with the sealing portion, and configured as having a radial surface adjacent the sealing element which is of a diametric extent sized to interfere with the periphery. Accordingly, the retaining element may be interference fit, depending upon the configuration of the assembly, on an inner or outer diameter of the periphery to be sealed to thereby hold the gasket in place irrespective of the orientation of the mating parts, and to provide positive location and alignment as the parts are being joined.

To facilitate the mounting of the gasket about periphery, the radial surface of the retaining element optionally may be formed as having a radiused or chamfered edge or other portion to effect a radial inward or outward deflection of the retaining portion as it is fitted within or around the periphery. As the gasket relaxes or otherwise returns to its original shape, the retaining element exerts a reaction force against the periphery to frictionally hold the gasket thereon. The retainer provides the rigidity necessary for the development of the reaction force, and further functions to resist torsional forces which otherwise would have the tendency to deform the gasket shape. However, the retainer also may be made sufficiently thin so as to be deflectable to accommodate complex curvatures between the mating surfaces.

Advantageously, the gasket construction of the present invention may be adapted for use with various sealing assembly configurations, and particularly may be configured to be mounted about either an inner or outer diameter of the periphery. Moreover, by virtue of the provision of the retaining portion, the gasket also is able to accommodate variations in tolerances between the mating parts without damage to itself or to the parts.

The present invention, accordingly, comprises the apparatus possessing the construction, combination of elements, and arrangement of parts which are exemplified in the detailed disclosure to follow. Advantages of the present invention include a sealing gasket construction which exhibits reliable sealing properties and torque retention with a minimum of compression set. Additional advantages include a gasket construction which is economical to manufacture, and which is self-locating, retaining, and aligning to both simplify and expedite installation. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIG. 9 is an exploded, fragmentary perspective assembly view showing the gasket of FIG. 7 as installed within a periphery for compression between a pair of mating, mutually-opposed interface surfaces within a representative joint assembly.

Figure 1:
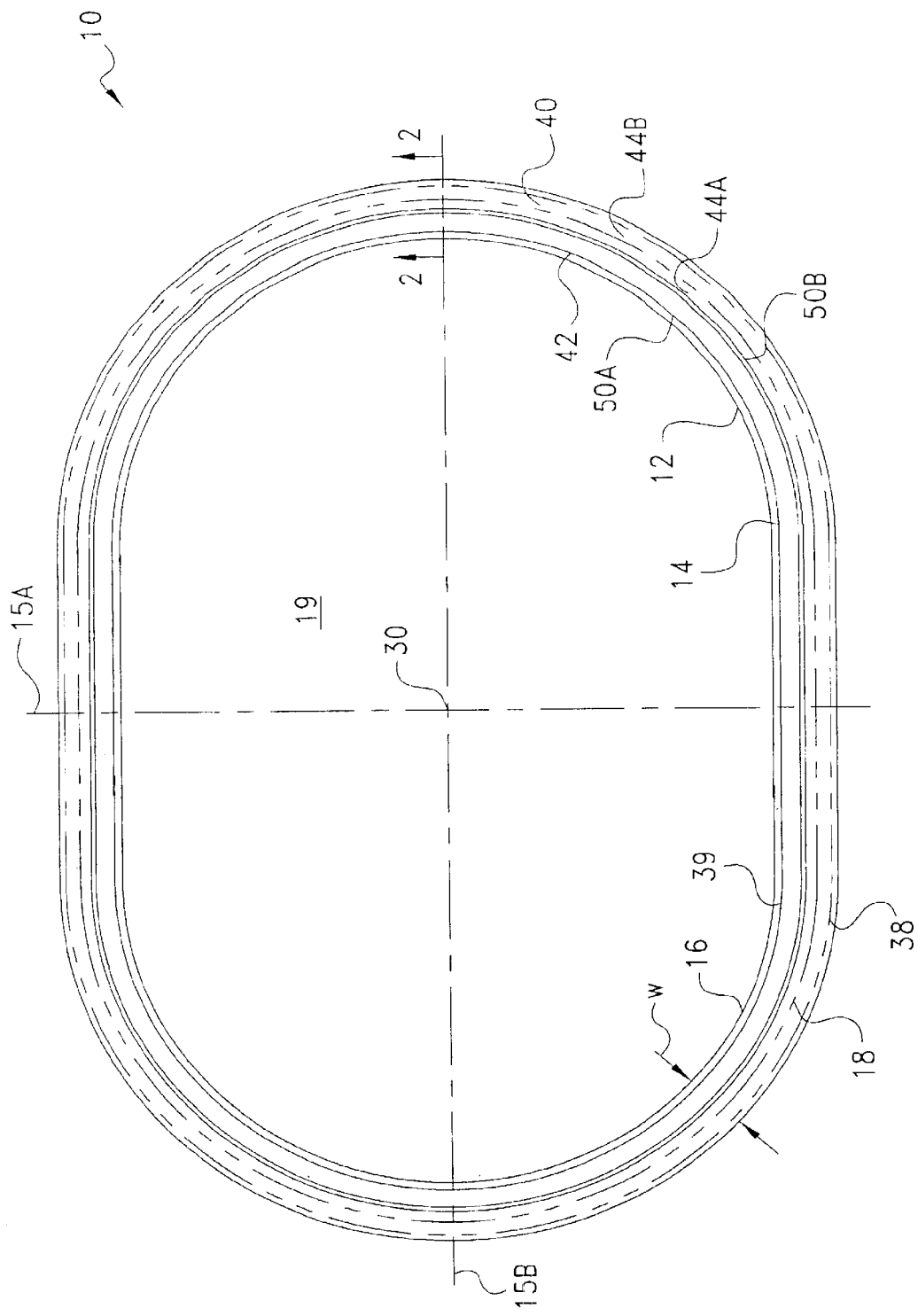
FIG. 1 is a plan view of a representative embodiment of an interference-fit gasket construction according to the present invention.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard" referring, respectively, to directions toward and away from the center of the referenced element, and the terms "radial" and "axial" referring, respectively, to directions perpendicular and parallel to the central longitudinal axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the illustrative purposes of the discourse to follow, the precepts of the flexible gasket construction of the present invention are described for illustrative purposes in connection with the configuration thereof for use as a seal between a fuel or other access panel or door and the skin or doubler of the underside of a wing or other superstructure of an aircraft. Assemblies of such type are shown, for example, in U.S. Pat. Nos. 5,213,286; 4,776,483; 4,579,248; 4,530,443; 4,324,517; 4,219,816; 3,863,421; and 2,517,012. With the interface surface of these structures registered in confronting opposition, the gasket of the invention may be compressed therebetween by means of a plurality of bolts or other fastening members received through registered pairs of openings spaced circumferentially about the interface surfaces.

In view of the discourse to follow, however, it will be appreciated that aspects of the present invention may find utility in other fluid sealing applications requiring a flexible gasket of the type herein involved. Use within those such other applications therefore should be considered to be expressly within the scope of the present invention.

Referring then to the figures wherein corresponding reference characters are used to designate corresponding elements throughout the several views with equivalent elements being referenced with prime or sequential alphanumeric designations, shown generally at 10 in FIG. 1 is a representative embodiment according to the present invention of an interference-fit gasket configured for interposition between a mating pair of mutually-opposed interface surfaces. In basic construction, gasket 10 includes an annular, generally planar retainer, 12, and a generally annular elastomeric member, 14, supported on one or more surfaces of the retainer and extending along at least a portion thereof to be compressible intermediate the interface surfaces (not shown in FIG. 1) for effecting a fluid-tight sealing thereof.

Figure 2:
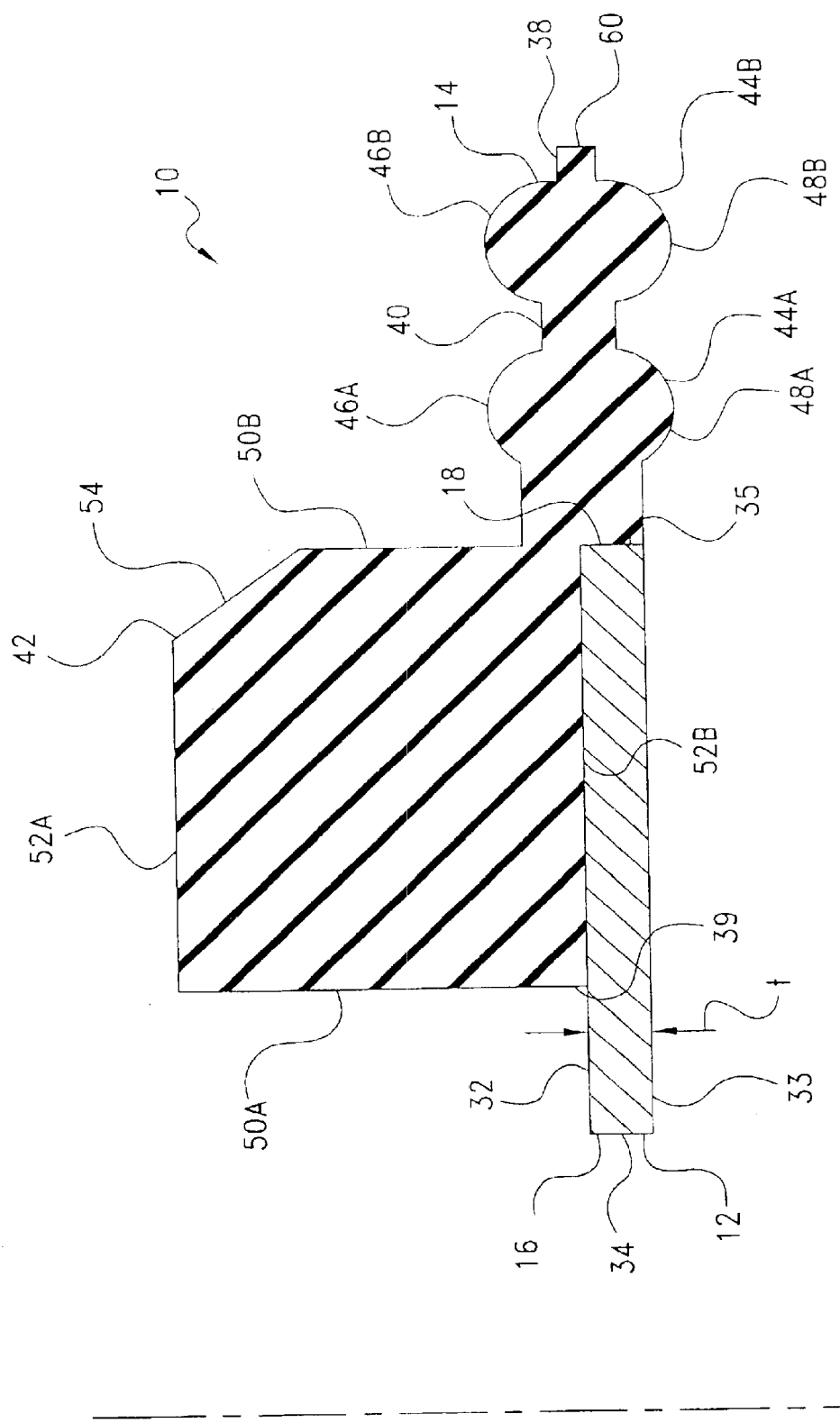
FIG. 2 is a magnified cross-sectional view of the gasket of FIG. 1 taken through line 2—2 of FIG. 1.

With additional reference to the cross-sectional view of FIG. 2, retainer 12 extends within the plane defined by the orthogonal horizontal or radial axes referenced at 15a–b in FIG. 1 as having an inner perimeter or margin, referenced at 16, and an outer perimeter or margin, referenced at 18 in FIG. 2. Together, the inner and outer perimeters 16 and 18 define a closed geometric shape which, in turn, encloses an opening, 19. Although the shape of retainer 12 is shown for purposes of illustration to be generally oval, such shape alternatively may be elliptical, circular, or otherwise arcuate, or regular or irregular polygonal or otherwise rectilinear depending upon the intended application.

With particular reference to FIG. 2, retainer 12 further is formed relative to a central axial or vertical axis, referenced at 30 in FIG. 2, as having mutually-opposing upper and lower radial surfaces, 32 and 33, respectively, and mutually-opposing inner and outer axial surfaces, 34 and 35, respectively. Radial surfaces 32 and 33 each extend generally perpendicular to axis 30 intermediate the inner and the outer perimeter 16 and 18 of the retainer 12, with the axial surfaces 34 and 35 each extending generally parallel to axis 30 in defining the corresponding inner and outer perimeters 16 and 18 of the retainer.

Returning to the plan view of FIG. 1, the inner perimeter 16 of retainer 12 and an outer extent, 38, of elastomeric member 14 together define a widthwise extent, referenced at "w", of gasket 10 therebetween which extent is sized such that gasket is receivable intermediate the interface surfaces to be sealed. Although the inner perimeter 16 of retainer 12 is shown in the embodiment 10 to terminate radially inwardly of an inner extent, 39, of elastomeric member 14, the retainer inner perimeter 16 alternatively may be dimensioned, depending upon available clearance or other design considerations, to terminate either coterminously with or radially inward of the extent 39.

Retainer 12 itself may be fabricated from a metal or plastic material which may be machined, cast, molded, or stamped. Suitable metal materials for the construction of retainer 12 include aluminum, steel, stainless steel, copper, brass, titanium, nickel, and alloys thereof, with aluminum being preferred for many applications. The metal may be anodized, plated, or otherwise for increased corrosion resistance. Depending upon its material of construction and the intended application, retainer 12 may have an axial thickness, referenced at "t" in FIG. 2, defined between radial surfaces 32 and 33 of between about 1/64–1/2 inch. For applications requiring gasket 10 to resiliently conform to simple or complex curvatures between the interfacing surfaces, the retainer thickness t generally may be less than about 30 mils for metal materials of construction, and preferably, about 25 mils or less.

With retainer 12 being provided as has been described, elastomeric member 14 may be adhesively bonded, interference fit, molded, or otherwise attached to or supported on surfaces 32 and 35 of the retainer as a preferably continuous or, alternatively, discontinuous or segmented annulus of an elastomeric material to complete the construction of gasket 10. In the illustrated configuration of FIG. 1, and as may be seen best in the cross-sectional view of FIG. 2, elastomeric member 14 is formed as having an outboard sealing portion, 40, and an inboard retaining portion, 42, concentric with the sealing portion. Although elastomeric member 14 is shown in gasket embodiment 10 of FIG. 2 to be unitary as having integral-formed sealing and retaining portions 40 and 42, the member 14 alternately may be provided as having discrete sealing and retaining portions.

With continuing reference to FIG. 2, sealing portion 40 may be seen to be supported on retainer surface 35 in extending radially from the retainer outer perimeter 35 generally coplanarly therewith. For its axial, sealing compression between the mating interface surfaces within the intended application, the sealing portion 40 may be configured as having at least one sealing bead element and, preferably, conjoined inner and outer bead elements, 44a–b, for effecting a first and a redundant second sealing of the interface surfaces. In the illustrated configuration of gasket 10, each of the bead elements 44 presents oppositely disposed, generally hemispherical upper, 46a–b, and lower, 48a–b, bearing surfaces which together define redundant upper and lower sealing surfaces of the gasket 10. Each of the bead elements 44 is shown in FIG. 1 to extend about the outer perimeter 18 of retainer 12 for generally coaxial registration with the margins of the interface faces of the application, although it will be appreciated that different geometries of bead elements 44 and gasket 10 may be envisioned depending upon the configuration of the corresponding interface surfaces of the intended application. Moreover, and as also depending upon the intended application, the bead elements 44 themselves may be supported on the retainer 12 such as by embedding the retainer within the elastomeric member 14.

As further depending upon the geometry of the interface surfaces, the bead elements 44 may be provided to extend axially beyond the corresponding radial surfaces 32 and 33 of the retainer 12 in having a nominal axial cross-sectional thickness that is between about 1–100 mils greater than the nominal axial thickness t of the retainer. Bead elements 44 may be shaped, as is shown, to have a generally circular or elliptical cross-sectional geometry, but alternatively may be configured as being lobe or otherwise arcuate-shaped. The bead elements 44 also may be of any radial extent, but typically will be between about 0.030–0.125 inches wide for most applications.

Retaining portion 42, in turn, is provided to be generally-upstanding relative to sealing portion 40 in extending axially beyond the upper radial surface 32 of retainer 12. With particular reference again to the cross-sectional view of FIG. 2, retaining portion 42 may be seen to be configured as having a generally polygonal cross-sectional geometry including a pair of oppositely-disposed inner and outer axial surfaces, 50a–b, which extend intermediate a distal radial surface, 52a, and a proximal radial surface, 52b, supported on the retainer upper radial surface 32. Although retaining portion 42 is shown in the embodiment 10 of FIGS. 1 and 2 to be supported on or otherwise to extend from only one side of retainer 12, alternative constructions may be envisioned such as the aforementioned arrangement wherein the retainer is embedded within the elastomeric member 14, or wherein the retaining portion is disposed radially inwardly or outwardly of the retainer. Moreover, although shown in FIGS. 1 and 2 to extend generally continuously along retainer 12, retaining portion 42 alternatively may be configured as a series of discrete segments.

As will be detailed hereinafter, the outer axial surface 50b immediately adjacent sealing portion 40 is configured as defining a margin of the retaining portion 42 which is sized to interferingly engage the internal periphery of one of the interface surfaces when the gasket 10 is mounted coaxially thereto. In this regard, the outer axial surface 50b has a leading edge, 54, which, as is shown, may be chamfered or otherwise angled inwardly to be engageable with the periphery in a manner effecting the inward deflection of the retaining portion 42 allowing it to be received within the periphery for its interfering engagement therewith.

In the manufacture of gasket 10, the surfaces 32 and 35 of retainer 12 may be primed with a bonding agent to assist in the chemical bonding of the elastomeric member 14. The primed retainer 12 then may be placed into a heated molded cavity for the injection, compression, or transfer molding of an uncured rubber or other elastomeric compound forming the sealing and retaining portions 40 and 42 of elastomeric member 14. The member 14 thereby may be formed and cured-in-place as vulcanized directly onto retainer 12. The outboard mold flash, which is referenced at 60 in FIG. 2, need not necessarily be removed as having no effect on the sealing performance of the gasket 10. Alternatively, the elastomeric member 14 may be molded in a separate operation and bonded to retainer 12 using an adhesive or the like.

Elastomeric member 14 preferably is formed of a rubber or other elastomeric material which may be selected specifically for high temperature performance or otherwise for compatibility with the fluid being handled. Suitable materials include natural rubbers such as Hevea, as well as thermoplastic, i.e., melt-processible, or thermosetting, i.e., vulcanizable, synthetic rubbers such as fluoropolymers, chlorosulfonate, polybutadiene, polybutadiene, buna-N, butyl, neoprene, nitrile, polyisoprene, silicone, fluorosilicone, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrenebutadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation.

Advantageously, the sealing and retaining portions 40 and 42 of elastomeric member 14 exhibit a reduced yield stress as compared to the metal retainer member 12 and, accordingly, are thereby deformable in the case of sealing portion 40 for conforming to any irregularities between the interface surfaces of the structures being sealed, and in the case of retaining portion 42 for effecting the interfering engagement with the periphery. With respect to the sealing portion 40, a given compressive load is applied by the tightening of the bolts which may be used to fasten the interface surfaces, an increased bearing stress is provided about along the margins thereof by virtue of the reduced surface area contact of the bearing surfaces 46 and 48 of the bead elements 44 on the interface surfaces. This increased stress will be sufficient to exceed the reduced yield stress of the bead elements 44 for the deformation thereof effecting the fluid-tight sealing of the interfacing surfaces.

In service, it should be observed that the provision of the bead elements 44 advantageously facilitates the installation and replacement of gasket 10 in accommodating for tolerances or other minor differences in the torque load of the bolts or other fastening members conventionally employed to join the interfacing surfaces. That is, by virtue of the resiliency of the bead elements 44, the fluid integrity of the gasket 10 may be maintained to some degree even if the joint spacing between the interfacing surface is less than exactly uniform. The bead elements 44, moreover, may be used to develop a hermetic seal which is especially useful in petrochemical and other applications to control the fugitive emission of VOC's and other pollutants.

Moreover, the combination of a relatively incompressible retainer 12 and relatively compressible sealing portion 40 further provides a gasket construction which minimizes torque loss and thereby obviates much of the need for the periodic retorquing of the fastening members used to secure the interfacing surfaces. That is, it is well-known that gaskets of the type herein involved may develop a compression set which is manifested by fluid leaks as the tension in the bolts is relaxed and the fluid-tight sealing of the interfacing surfaces is compromised. In this regard, the provision of bead elements 44 ensures positive sealing, with retainer 12, in turn, synergistically providing generally non-yielding contact in establishing an alternative load torque path minimizing the compression set and leak potential of the gasket 10. That is, the use of a retainer allows the mating parts to bear stress loads which otherwise would cause the deformation or extrusion of a gasket which lacked a retainer. In the case of a metal retainer 12, such contact additionally affords improved heat transfer between the interface surfaces, and also develops relatively high seal stresses for assured fluid-tight sealing of the interfacing structures.

Indeed, the gasket 10 of the invention further may be provided to be relatively flexible along the diametric extents thereof by controlling the axial thickness or the retainer 12 notwithstanding that the retainer is otherwise rigid relative to axially- or radially-imposed compressive loadings or other induced stresses. When employed, for example, as an access door seal for an aircraft wing or other superstructure, the gasket of the invention thereby may be made resiliently conformable to curvatures of the interface surfaces in effecting the fluid-tight sealing thereof. By "resilient," it is meant that the gasket is able to recover to a generally planar, normal state without appreciable permanent deformation or set. However, the otherwise rigid retainer also allows the door to bear some portion of the stress load in the wing. In this regard, it is believed that the gasket of the invention will minimize stress cracking in the wing skin by reducing the stress at the corners of the access door opening.

Figure 3:
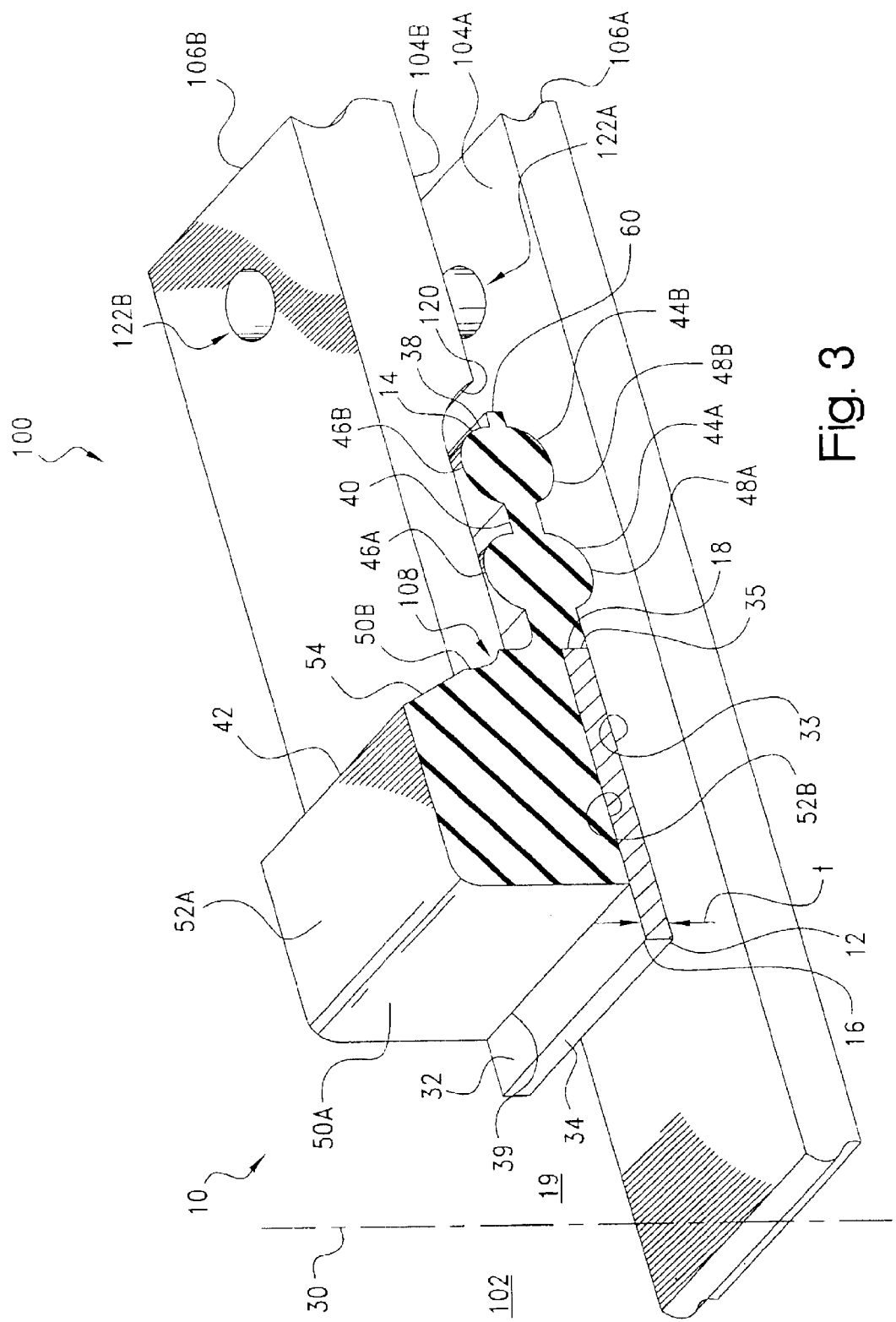
FIG. 3 is an exploded, fragmentary perspective assembly view showing the gasket of FIG. 1 as installed within a periphery for compression between a pair of mating, mutually-opposed interface surfaces within a representative joint assembly.

Turning now to the exploded perspective view of FIG. 3, a representative joint assembly is referenced generally at 100 as having an opening, 102, which is sealed by means of gasket 10 of the present invention. Within the assembly 100, gasket 10 of the present invention is shown as registered between a pair of mutually-facing, axially spaced-apart interfaces surfaces, 104a–b. The surfaces 104 are presented by the corresponding structures 106a–b which may be, respectively, an access door and a wing or other section located on the underside of an aircraft wing or other superstructure. Gasket 10 is interposed between the interface surfaces 104, with the opening 19 of the gasket being aligned in general coaxial registration with the opening 102 formed through the wing underside surface 104b.

The wing underside opening 102 may be seen in FIG. 3 to have a circumferential periphery, 108, which is of a given diametric extent. For the installation or mounting of gasket 10 to that periphery 108, the retaining portion 42 of the gasket elastomeric member 14 is inserted coaxially within the opening 102. In this regard, the outer axial surface 50b of retaining portion 42 is configured as having an outer diameter which is marginally larger than the inner diametric extent of the opening 102. Accordingly, as the proximal radial surface 52a of the retaining portion 42 is received within the opening 102, the angled leading edge 54 of axial surface 50b gradually engages the periphery 108 in a force transmitting contact. As the installation progresses, a radial inward deflection or other compression of the mass of the retaining portion 42 is effected which accommodates the insertion thereof into the opening 102. As the mass thereafter relaxes in the return of the retaining portion 42 towards its normal orientation, a radially outwardly-directed compressive force is developed by the interfering engagement, depicted at 110, of the retaining portion axial surface 50b and the opening periphery 108. Such interfering engagement 110 is effective to retain the gasket 10 about the periphery 108 in a manner which is generally independent of the orientation of the surface 104b. Thus, gasket 10 may be installed, for example, on the underside of a wing surface and thereby held in place as the remainder of the parts are being aligned and assembled.

In completing the assembly 100 of FIG. 3, with the gasket 10 being mounted in the manner described to surface 104b, the bead elements 44 of the sealing portion 40 may be received, for example, in an annular undercut, 120, formed within the surface 104b concentrically about the opening 108. Thereupon, panel 106a may be positioned over the opening 102, secured to the wing underside 106b with a plurality of bolts or other fastening members (not shown). For receiving the fastening members, a plurality of bores, one of which is referenced at 122a for surface 104a and at 122b for surface 104b, may be defined within each of interface surfaces 104 as disposed generally adjacent the opening 102. Each of the bores 122 of each surface 104a–b is in alignment with a corresponding bore of the other surface 104a–b to define a hole for the receipt of an associated fastening member. The surfaces 104 thereby may be joined, such as with the hole 122b being internally threaded, with the fastening members being tightened to a predetermined torque to effect the conforming compression of the gasket bead elements 44 in a sealing engagement between interface surfaces 104.

In particular, upon the tightening of the fastening members to a predetermined torque, the gasket bead element 44 are compressed between interface surfaces 104 to a thickness which may be about equal to the thickness t of the retainer 12. In the embodiment of gasket 10 shown in FIGS. 1–3, redundant, i.e., double, inner and outer seals are effected by the bead elements for the fluid-tight sealing of opening 102.

Figure 4:
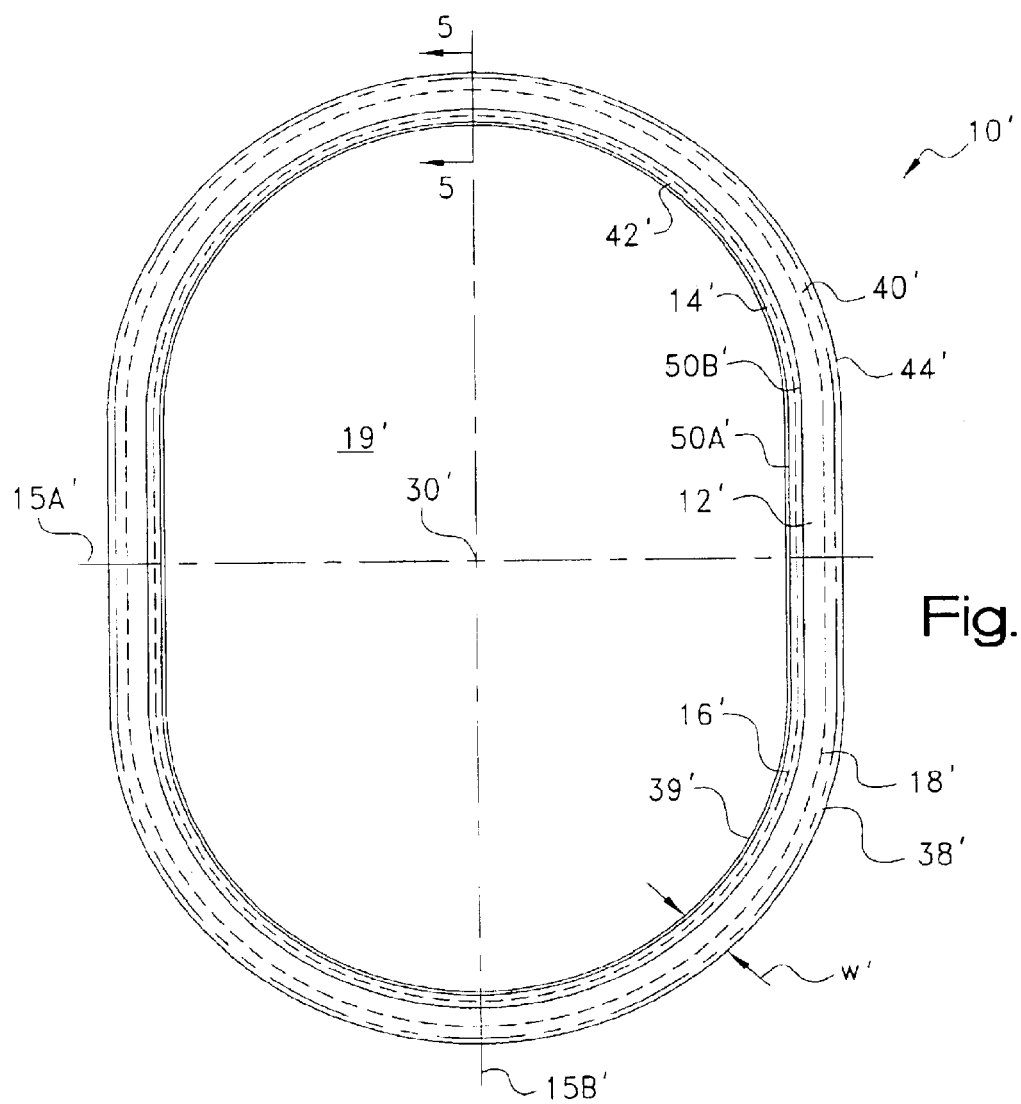
FIG. 4 is a plan view of an alternative embodiment of an interference-fit gasket construction according to the present invention.
Figure 5:
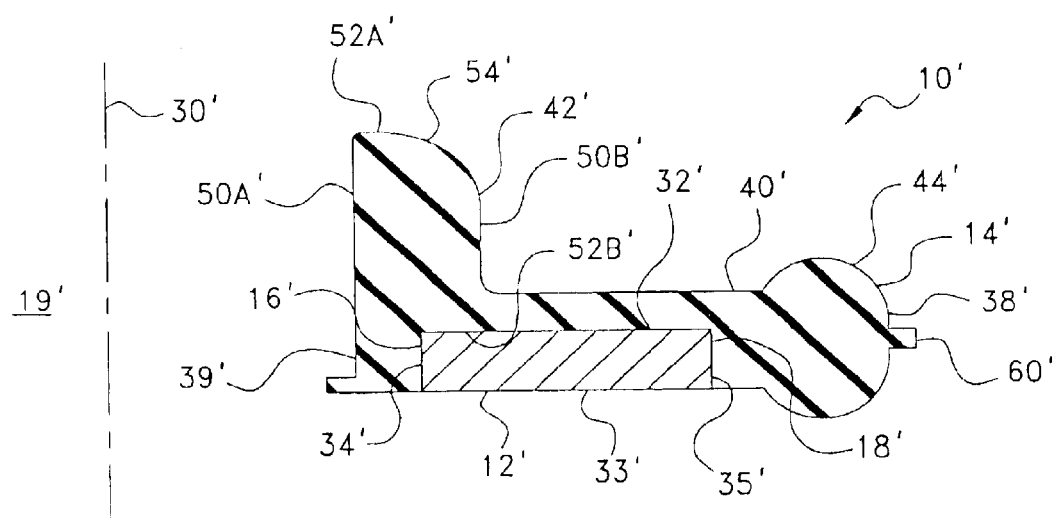
FIG. 5 is a magnified cross-sectional view of the gasket of FIG. 4 taken through line 5—5 of FIG. 4.

Turning next to FIGS. 4–5, an alternative embodiment of gasket 10 of the present invention is shown generally at 10'. In basic construction, gasket 10' of the invention is similar to that of gasket 10 of FIG. 1, with the primary difference being that the inner perimeter 16' of retainer 12' is provided to terminate radially outwardly of the inner extent 39' of elastomeric member 14' such that the retaining portion 42' thereof additionally is supported on the retainer inner axial surface 34'. Retaining portion 42' also has a decreased radial span and a radiused leading edge 54', with sealing portion 40' further being configured as having a single bead element 44'.

Figure 6:
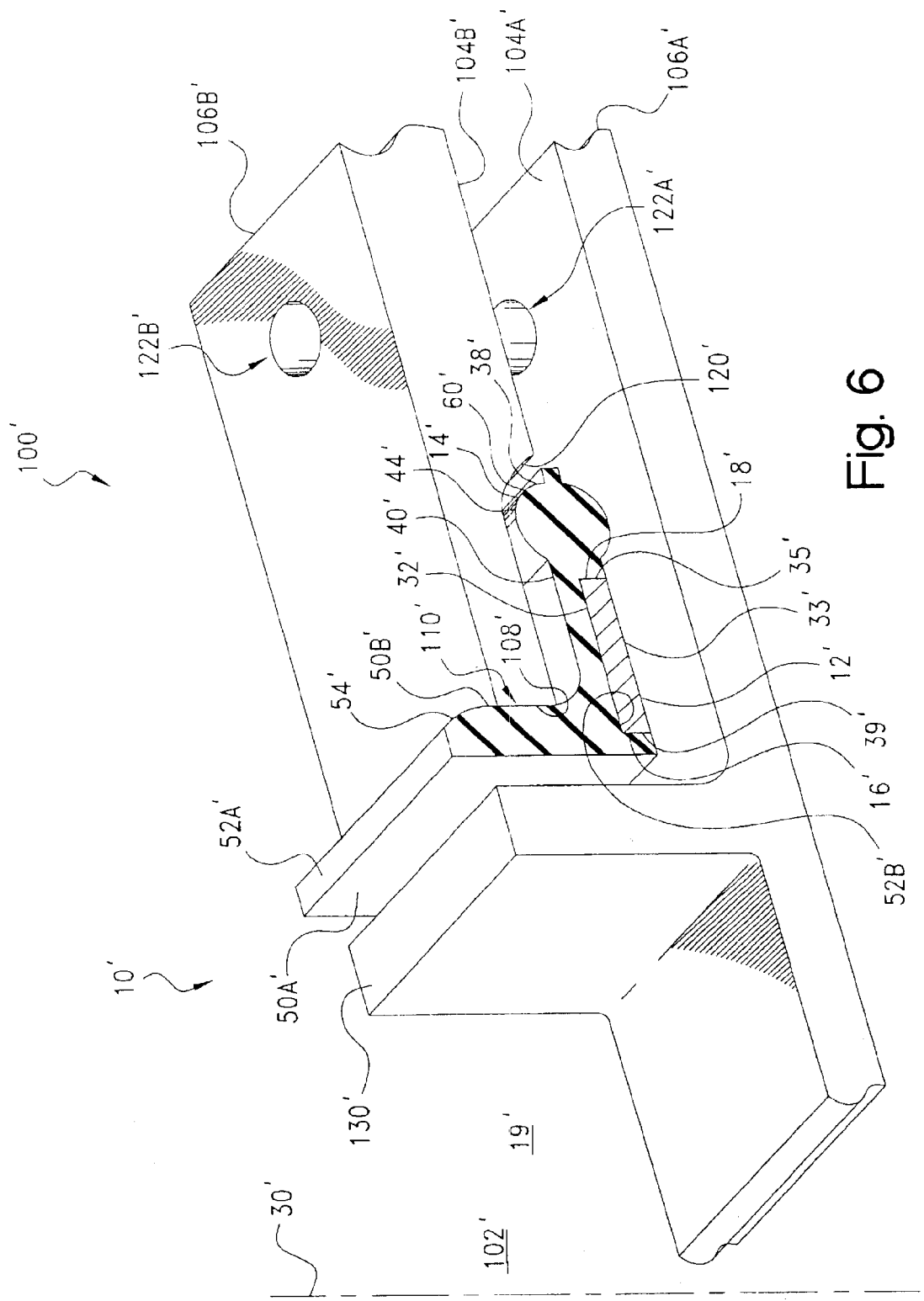
FIG. 6 is an exploded, fragmentary perspective assembly view showing the gasket of FIG. 4 as installed within a periphery for compression between a pair of mating, mutually-opposed interface surfaces within a representative joint assembly.

In such configuration of gasket 10', as may be seen with additional reference to the assembly 100' of FIG. 6, additional radial clearance may be provided for accommodating ribs or other supports, 130, which may extend into opening 102' from the surface 104a' of the structure 106a'. As having a relatively narrow radial extent w' between the outer and inner extents 38' and 39' of elastomeric member 14' (see FIG. 4), gasket 10' thereby may be interference fit within the opening 102' with the retaining portion 42' being interposed between the opening periphery 108' and the support 130.

Figure 7:
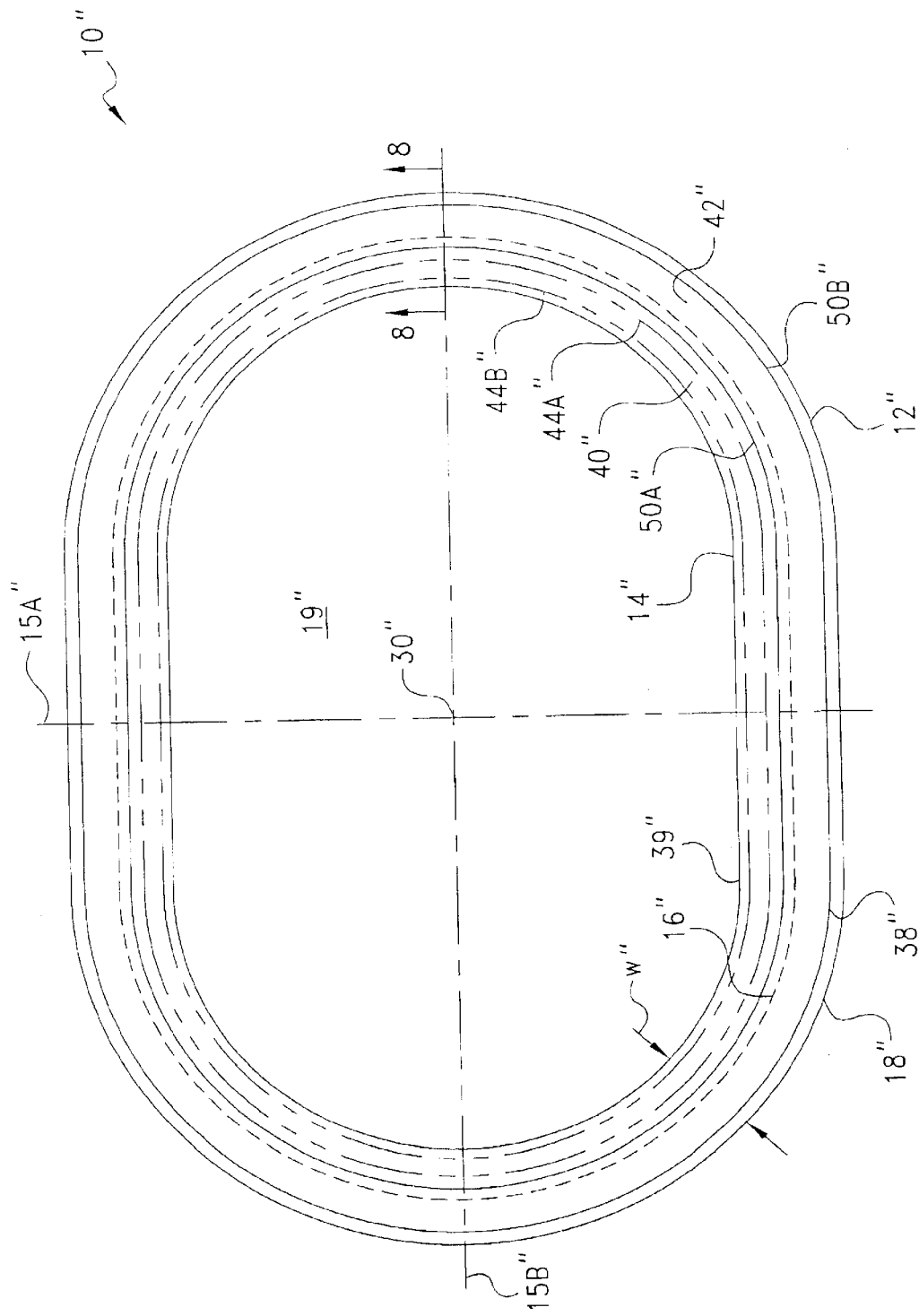
FIG. 7 is a plan view of a representative embodiment of an interference-fit gasket construction according to the present invention.
Figure 8:
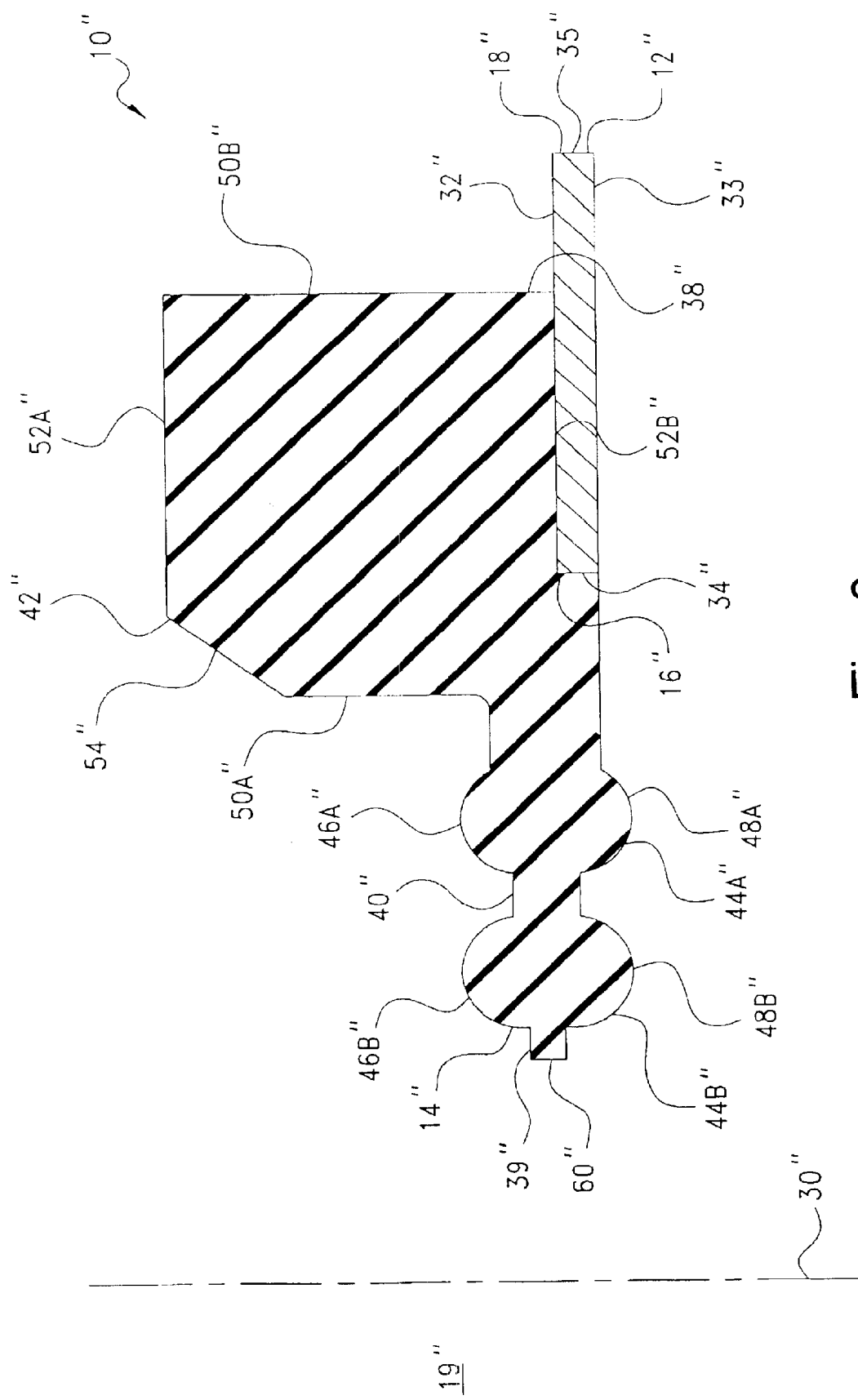
FIG. 8 is a magnified cross-sectional view of the gasket of FIG. 7 taken through line 8—8 of FIG. 7.

Looking now to FIGS. 7–8, another alternative gasket construction of the present invention is shown generally at 10" as configured for mounting around the circumference of an outer periphery of a panel, door, or other structure. With momentary reference to the gasket 10 of FIGS. 1 and 2, gasket 10" of FIGS. 7 and 8 can be seen to be the mirror image of gasket 10. In this regard, elastomeric member 14" is supported on surfaces 32" and 34" of retainer 12" such that the sealing portion 40" of the elastomeric member 14" extends radially inwardly from the retainer inner perimeter 16". Accordingly in the gasket construction 10", the gasket widthwise extent w" is defined by the retainer outer perimeter 18" and the inner extent 39" of elastomeric member 14".

The retaining portion 42" of elastomeric member 14", in turn, is provided in the gasket construction 10" such that the inner axial surface 50a" immediately adjacent the sealing portion 40" is configured as defining a margin which is sized to interferingly engage the external periphery of one of the interface surfaces when the gasket 10" is mounted coaxially thereto. The leading edge 54" of the retaining portion inner axial surface 50a" thus is chamfered or otherwise angled inwardly to be engageable with the periphery in a manner effecting the outward deflection of the retaining portion 42" allowing it to be received circumferentially about the periphery for its interfering engagement therewith.

Turning lastly then to the exploded perspective view of FIG. 9, a representative joint assembly for gasket construction 10" of FIGS. 7 and 8 is referenced generally at 100" as having an opening 102" which is sealed by means of both a gasket 10 and a mirror-imaged gasket 10" of the present invention. Within the assembly 100", gasket 10" is registered between a pair of mutually-facing, axially spaced-apart interfaces surfaces, 150a–b, with gasket 10 being registered between surface 150b and another facing surface, 150c. The surfaces 150a–c are presented by the corresponding structures 152a–c. In the assembly 100", structure 152a may be the skin on the underside of an aircraft wing, structure 152c may be an associated door or panel, and structure 152b may be a separate backup plate which is received within the interior of the wing 152a. As mounted on the backup plate 152b, each of the gaskets 10 and 10" is interposed between the corresponding interface surfaces 150 with gasket 10 being aligned in general coaxial registration radially inwardly of the opening 102" formed in the wing skin 152a, and with gasket 10" being aligned in general coaxial registration radially outwardly of the opening 102".

The backup plate 152b may be seen in FIG. 9 to be generally ring-shaped in having an outer circumferential periphery, 160, which is of a given outer diametric extent, and an inner circumferential periphery, 162, which is of a given inner diametric extent. In the mounting of the gaskets 10 and 10" to the plate 152b, the retaining portion 42" of the gasket 10" elastomeric member 14" is received coaxially around the circumference of the outer periphery 162, with the retaining portion 42 of the gasket 10 elastomeric member 14 being inserted coaxially within the inner periphery 162 otherwise in the manner described hereinbefore in connection with FIGS. 1–3. With respect to gasket 10", the inner axial surface 50a" of retaining portion 42" is configured as having an inner diameter which is marginally smaller than the outer diametric extent of the outer periphery 160. Accordingly, as the proximal radial surface 52a" of the retaining portion 42" is received coaxially around the outer circumference of the plate 152b, the angled leading edge 54" of axial surface 50a" gradually engages the periphery 160 in a force transmitting contact. As the installation progresses, a radial outward deflection or other compression of the mass of the retaining portion 42" is effected which accommodates the mounting thereof around the circumference of periphery 160. As the mass thereafter relaxes in the return of the retaining portion 42" towards its normal orientation, a radially inwardly-directed compressive force is developed by the interfering engagement, depicted at 110", of the retaining portion axial surface 50a and the periphery 160. Such interfering engagement 110" is effective to retain the gasket 10" about the periphery 160 in a manner which is generally independent of the orientation of the surface 150b.

In completing the assembly 100" of FIG. 9, the gaskets 10" and 10 both may be mounted to backup ring 152b with the respective the bead elements 44" and 44 of the gasket sealing portions 40" and 40 each being received, for example, in a corresponding annular undercut, 170 and 172, formed within the surface 150b concentrically about a corresponding one of the peripheries 160 and 162. Together with the mounted gaskets 10 and 10", the ring 152b may be received through opening 102" in wing 152a and positioned in coaxial registration therewith. In this regard, both the opening 102" and the ring 152b may be generally oval or oblong-shaped so as to have a major and a minor extent with the minor extent of the ring being receivable through the major extent of the opening. Thereupon, panel 152c may be positioned over the opening 102" and secured to the plate 152b with a plurality of bolts or other fastening members (not shown). For receiving the fastening members, a plurality of bores, one of which is referenced at 180 for ring 152b and at 182 for door 152c may be defined within the corresponding interface surface 150b–c. Similarly, wing 152a may be joined to the ring 152b with bolts or other fasteners (not shown) each received through a registered pair of bores 184 and 186. Upon the tightening of the bolts, the bead elements 44 and 44" and the gaskets 10 and 10" are compressed in a fluid-tight, sealing engagement between the corresponding interface surfaces 150 to provide for an inner and outer sealing of the opening 102.

Thus, a unique gasket construction for access doors and other commercial, industrial, or military applications is described which exhibits reliable sealing properties and torque retention with a minimum of compression even in the sealing of complex curved surfaces. Additional advantages include a gasket construction which is economical to manufacture and which facilitates installation.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A gasket for interposition between a first and an opposing second interface surface of a sealing assembly, one of the first and second interface surfaces having a periphery of a given diametric extent which periphery defines a margin of the one of the interface surfaces, and said gasket having a generally planar first side and a second side, and comprising:

a generally planar retainer having an inner perimeter and an outer perimeter which together define a closed geometry registrable about said periphery; and a generally annular elastomeric member supported on said retainer to extend along at least a section of the geometry thereof, wherein said retainer is generally co-planar with at least a section of said first planar side of said gasket, said elastomeric member having a sealing portion configured to be compressible axially intermediate the first and second interface surfaces for effecting one or more fluid-tight seals therebetween, and said elastomeric member having a retaining portion concentric with said sealing portion, said retaining portion being disposed on the second side of the gasket, and being generally upstanding and having oppositely disposed first and second axial surfaces, one of said first and second axial surfaces defining a margin of said retaining portion sized to interferingly engage said periphery when said gasket is mounted coaxially thereto, said interfering engagement of said retaining portion and said periphery being effective to retain said gasket about said periphery, and said sealing portion extending laterally of the retaining portion adjacent and radially outwardly of the one of said first and second axial surfaces defining the margin of the retaining portion sized to interferingly engage said periphery.

2. The gasket of claim 1 wherein said retaining portion of said elastomeric member is configured as having a generally polygonal cross-sectional geometry.

3. The gasket of claim 1 wherein said one of said first and second axial surfaces which define said margin of said retaining portion has a leading edge engageable with said periphery to effect a deflection of said retaining portion as said gasket is being mounted coaxially to said periphery, said deflection being effective to accommodate said interfering engagement between said retaining portion and said periphery.

4. The gasket of claim 3 wherein said leading edge is chamfered or radiused.

5. The gasket of claim 1 wherein said retainer is formed of a metal material.

6. The gasket of claim 5 wherein said metal material forming said retainer is selected from the group consisting of aluminum, steel, stainless steel, copper, brass, titanium, nickel, and alloys thereof.

7. The gasket of claim 5 wherein said retainer has oppositely-disposed first and second radial surfaces defined intermediate said inner and said outer perimeter, said first and second radial surfaces defining an axial thickness dimension of said retainer therebetween, said axial thickness dimension being about 25 mils or less.

8. The gasket of claim 1 wherein said elastomeric member is formed of a polymeric material selected from the group consisting of natural rubbers and synthetic rubbers.

9. The gasket of claim 1 wherein said periphery is defined about an opening within said one of the first and second interface surfaces of said sealing assembly, said opening having a given inner diametric extent, and wherein said retaining portion of said gasket elastomeric member is received within said opening when said gasket is mounted coaxially to said periphery, said one of said first and second axial surfaces having an outer diameter with is marginally larger than the inner diametric extent of said opening to interferingly engage said opening when said retaining portion of said elastomeric member is received therewithin.

10. The gasket of claim 9 wherein said sealing portion of said elastomeric member extends radially from the outer perimeter of said retainer generally coplanarly therewith said retainer.

11. The gasket of claim 1 wherein said elastomeric member extends substantially continuously along the entirety of the geometry of said retainer.

12. The gasket of claim 1 wherein said sealing portion of said elastomeric member is configured as having one or more bead portions, each of said bead portions being compressible axially intermediate the first and second interface surfaces for effecting said one or more fluid-tight seals therebetween.

13. The sealing assembly of claim 1 wherein said periphery is defined about an opening within said one of said first and second interface surfaces, said opening having a given inner diametric extent, and wherein said retaining portion of said gasket elastomeric member is receivable within said opening, said one of said first and second axial surfaces having an outer diameter with is marginally larger than the inner diametric extent of said opening to interferingly engage said opening when said retaining portion of said elastomeric member is received therewithin.

14. The sealing assembly of claim 13 wherein said sealing portion of said elastomeric member extends radially from the outer perimeter of said retainer generally coplanarly therewith said retainer.

15. A sealing assembly comprising:

mutually-opposable first and second interface surfaces, one of said first and second interfaces surface having a periphery of a given diametric extent which periphery defines a margin of said one of said interface surfaces, and a having an undercut formed therein about the periphery; and a gasket mountable coaxially to one of said first and second interface surfaces for interposition therebetween the other one of said first and second interface surfaces, said gasket having a generally planar first side and a second side, and comprising:

a generally planar retainer having an inner perimeter and an outer perimeter which together define a closed geometry registrable about said periphery; and a generally annular elastomeric member supported on said retainer to extend along at least a section of the geometry thereof, wherein said retainer is generally co-planar with at least a section of said first planar side of said gasket, said elastomeric member having a sealing portion which is receivable within the undercut and compressible axially intermediate the first and second interface surfaces for effecting one or more fluid-tight seals therebetween, and said elastomeric member having a retaining portion concentric with said sealing portion, said retaining portion being disposed on the second side of the gasket, and being generally-upstanding and having oppositely disposed first and second axial surfaces, one of said first and second axial surfaces defining a margin of said retaining portion sized to interferingly engage said periphery when said gasket is mounted coaxially thereto, said interfering engagement of said retaining portion and said periphery being effective to retain said gasket about said periphery.

16. The sealing assembly of claim 15 wherein said retaining portion of said elastomeric member is configured as having a generally polygonal cross-sectional geometry.

17. The sealing assembly of claim 15 wherein said one of said first and second axial surfaces which define said margin of said retaining portion has a leading edge engageable with said periphery to effect a deflection of said retaining portion as said gasket is being mounted coaxially to said periphery, said deflection being effective to accommodate said interfering engagement between said retaining portion and said periphery.

18. The sealing assembly of claim 17 wherein said leading edge is chamfered or radiused.

19. The sealing assembly of claim 15 wherein said one of said first and second axial surfaces which define said margin of said elastomeric member retaining portion is adjacent said sealing portion.

20. The sealing assembly of claim 15 wherein said retainer is formed of a metal material.

21. The sealing assembly of claim 20 wherein said metal material forming said retainer is selected from the group consisting of aluminum, steel, stainless steel, copper, brass, titanium, nickel, and alloys thereof.

22. The sealing assembly of claim 20 wherein said retainer has oppositely-disposed first and second radial surfaces defined intermediate said inner and said outer perimeter, first and second radial surfaces defining an axial thickness dimension of said retainer therebetween, said axial thickness dimension being about 25 mils or less.

23. The sealing assembly of claim 15 wherein said elastomeric member is formed of a polymeric material selected from the group consisting of natural rubbers and synthetic rubbers.

24. The sealing assembly of claim 15 wherein said elastomeric member extends substantially continuously about the entirety of the geometry of said retainer.

25. The sealing assembly of claim 15 wherein said sealing portion of said elastomeric member is configured as having one or more bead portions, each of said bead portions being compressible axially intermediate the first and second interface surfaces for effecting said one or more fluid-tight seals therebetween.

26. A sealing assembly comprising:
mutually-opposable first and second interface surfaces, one of said first and second interfaces surface having a periphery of a given diametric extent defined about a circumference of said one of said first and second interface surfaces which periphery defines a margin of said one of said interface surfaces, and having an undercut formed therein about the periphery, said circumference having a given outer diametric extent; and a gasket mountable coaxially to one of said first and second interface surfaces for interposition therebetween the other one of said first and second interface surfaces, said gasket comprising:

a generally planar retainer having an inner perimeter and an outer perimeter which together define a closed geometry registrable about said periphery; and a generally annular elastomeric member supported on said retainer to extend along at least a section of the geometry thereof, said elastomeric member having a sealing portion which is receivable within the undercut and compressible axially intermediate the first and second interface surfaces for effecting one or more fluid-tight seals therebetween, and said elastomeric member having a retaining portion concentric with said sealing portion, said retaining portion being generally-upstanding and having oppositely disposed first and second axial surfaces, one of said first and second axial surfaces defining a margin of said retaining portion sized to interferingly engage said periphery when said gasket is mounted coaxially thereto, said interfering engagement of said retaining portion and said periphery being effective to retain said gasket about said periphery, wherein said retaining portion of said gasket elastomeric member is received around said circumference, said one of said first and second axial surfaces having an inner diameter which is marginally smaller than the outer diametric extent of said circumference to interferingly engage said circumference when said retaining portion of said elastomeric member is received therearound.

27. The sealing assembly of claim 26 wherein said sealing portion of said elastomeric member extends radially from the inner perimeter of said retainer generally coplanarly therewith said retainer.

* * * * *